US012707274B2

(12) United States Patent
Tran et al.

(10) Patent No.: US 12,707,274 B2
(45) Date of Patent: Aug. 11, 2026

(54) NETWORK SLICE SWITCHING FOR LEGACY APPLICATIONS/NETWORK DEVICES

(71) Applicant: T-Mobile USA, Inc., Bellevue, WA (US)

(72) Inventors: Antoine T. Tran, Bellevue, WA (US); Emile Minh Tran, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 306 days.

(21) Appl. No.: 18/390,961

(22) Filed: Dec. 20, 2023

(65) Prior Publication Data

US 2025/0212002 A1 Jun. 26, 2025

(51) Int. Cl.
*H04W 16/10* (2009.01)

(52) U.S. Cl.
CPC .................................. *H04W 16/10* (2013.01)

(58) Field of Classification Search
None
See application file for complete search history.

(56) References Cited

U.S. PATENT DOCUMENTS 10,764,333 B2 * 9/2020 Nagarkar .............. H04L 63/205
2018/0241720 A1 * 8/2018 Healy ................. H04L 63/0245
2023/0217309 A1 * 7/2023 Higuchi .................. H04L 47/24
370/235
2025/0150890 A1 * 5/2025 Cho .................... H04L 47/2416
2025/0374353 A1 * 12/2025 Salkintzis ............ H04W 76/15

* cited by examiner

*Primary Examiner* — Minh Trang T Nguyen
(74) *Attorney, Agent, or Firm* — Lee & Hayes, P.C.

(57) ABSTRACT

Techniques are described herein for assigning a tag to untagged network traffic in order to allocate the network traffic to an appropriate network slice. In embodiments, the techniques may involve receiving network traffic that is untagged, determining information about the network traffic, identifying, based on the information about the network traffic, a set of attribute values associated with the network traffic, and assigning, based on the set of attribute values and based on configuration data, a tag to the network traffic. In embodiments, the network traffic is then allocated to a network slice associated with the assigned tag. In some embodiments, the techniques may further involve providing an indication of the tag and information about network traffic to at least one second computing device, and receiving, at the access point device from the at least one second computing device, updated configuration data.

20 Claims, 8 Drawing Sheets

NETWORK SLICE SWITCHING FOR LEGACY APPLICATIONS/NETWORK DEVICES

BACKGROUND

Cellular networks are frequently used to enable communication between various mobile devices. In a cellular network (such as the Global System for Mobile communication (GSM) and TETRA (TErrestrial Trunked RAdio)), a geographical region is divided into a number of cells, each of which is served by a base station (also referred to as a Base Transceiver Station (BTS)). Such cellular networks are typically made up of a number of base stations that are geographically distributed throughout the geographical region in a way that maximizes wireless transmission coverage for the cellular network.

In recent years, cellular technology has advanced to its fifth generation (5G). One feature that may be implemented in 5G cellular networks is network slicing, which is a network architecture that enables the creation of independent logical networks (e.g., network slices) on the same physical network infrastructure. In 5G network slicing, each of a number of network slices may be dedicated to a different type or category of network traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

This disclosure describes techniques that may be performed to enable efficient allocation of network traffic to an appropriate network slice, even when such network traffic is not initially tagged by an origination device/application. Network architectures often include network segments that are logically partitioned and configured to optimally transmit a particular type of network traffic (e.g., network slices).

An access point device may manage access to a network for multiple user devices in proximity to that access point device. When the access point device receives network traffic that is directed to a destination that is accessed over the network, the access point may identify a tag associated with that network traffic and may allocate the network traffic to an appropriate network slice based on that tag. However, if the network traffic does not include such a tag, the access point device may conventionally allocate such network traffic to a default network slice (e.g., a network slice that is not optimized for any particular type of network traffic).

In embodiments, an access point device may, upon receiving network traffic that is not assigned a tag, retrieve tag information (e.g., configuration data) as distributed by a core computing device. Such tag information may be generated based on aggregating tag assignment information as provided by multiple access point devices to the core computing device. Provided that the tag information does not include tag information that is relevant to untagged network traffic received at the access point device, the access point device may determine an appropriate tag for that network traffic based on its similarity to the tag information. For example, a trained machine learning model may be used to determine a degree of similarity between the untagged network traffic and network traffic associated with a particular tag. The access point device may then assign an appropriate tag to the untagged network traffic and route the network traffic over an appropriate network slice.

Embodiments of the disclosure provide for a number of advantages over conventional systems. For example, the implemented system may enable legacy electronic devices to take advantage of efficiencies created using a network slice architecture. While the use of a network slice architecture optimizes communication efficiency by enabling network traffic to be assigned to a partition best suited for that network traffic, network slicing is relatively new and may not provide a benefit to network traffic originating at legacy devices (e.g., devices designed/configured prior to the implementation of the technology), which were not programmed with network slices in mind. Embodiments of the disclosure allow for automatic assignment of network traffic to an appropriate network slice even if that network traffic originates at a legacy device for which network slices would not conventionally be available.

Figure 1:
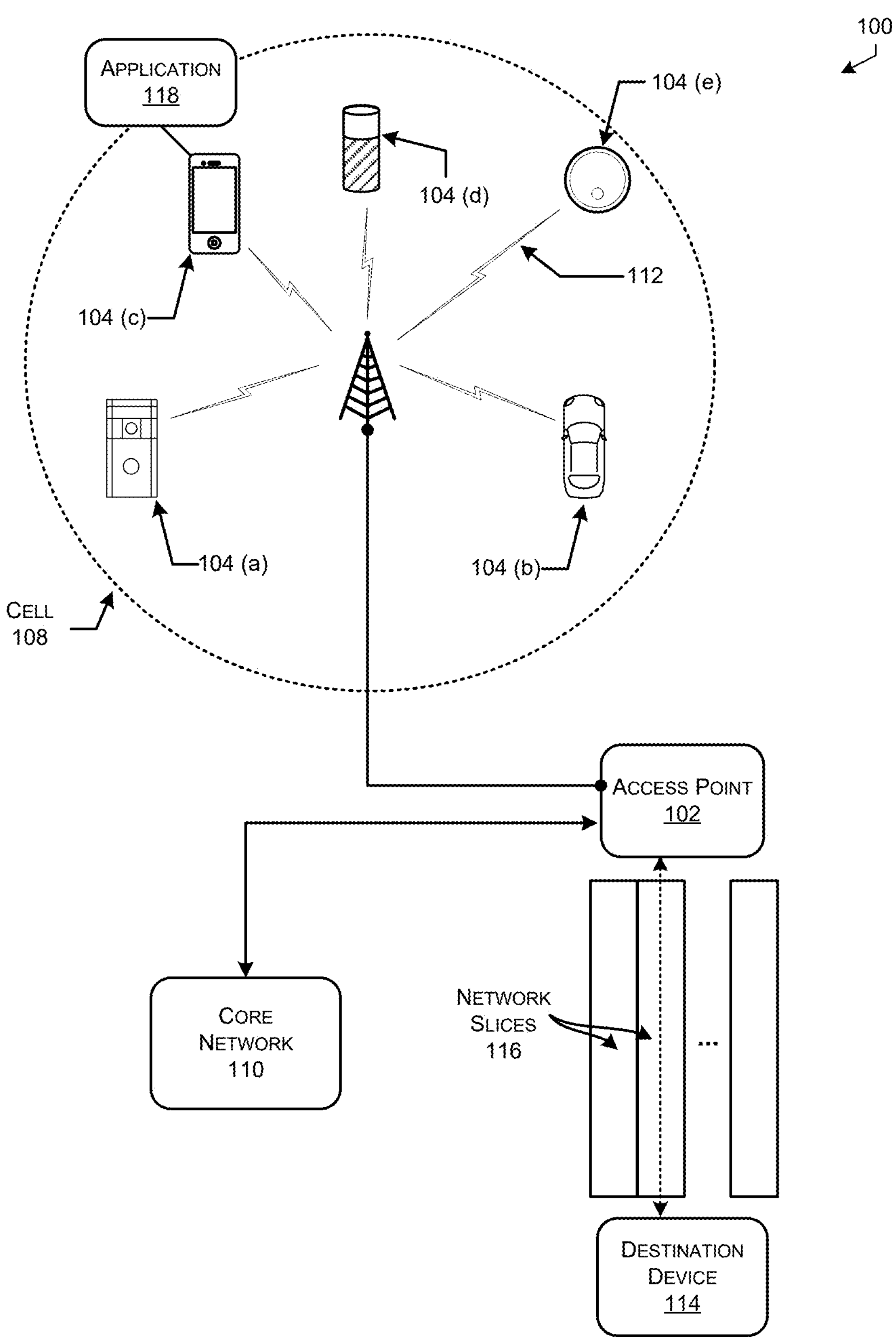
FIG. 1 is a block diagram that illustrates a wireless telecommunication network in which aspects of the disclosed technology may be implemented in accordance with embodiments.

FIG. 1 is a block diagram that illustrates a wireless telecommunication network 100 in which aspects of the disclosed technology may be implemented in accordance with embodiments. The network 100 includes at least one access point 102. In some embodiments, the access point 102 may be, or may be implemented within, a base station (e.g., access point 102).

A base station is a type of network access node (NAN) that can also be referred to as a cell site, a base transceiver station, or a radio base station. In some embodiments, the access point 102 may include one or more radio access units that provide service (e.g., cellular data service) to a user device 104 within a cell 108 that defines a geographic area. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The access points forming the network 100 may communication with a number of user devices. For example, access point 102 may be in communication with user devices 104(*a-e*). Additionally, a group of neighboring base stations/access points 102 may be managed by a base station controller (not shown) that provides access to a network managed by a core management device 110.

An access point 102 implemented as a base station may include one or more transmission mechanisms (e.g., a radio transceiver) capable of enabling wireless communication with a number of user devices. Such base stations may be distributed over an area in a sufficiently dense manner such that user devices (e.g., mobile communication devices) in communication with the network can communicate with each other or with a terrestrial network. In some embodiments, the access point 102 may include one or more sensors configured to collect information about the access point 102 itself or an environment in which the access point 102 is situated. Additionally, the access point 102 may include one or more mechanical means of adjusting/configuring components of the equipment node. For example, the equipment node may include a radio antenna as well as a motorized mechanism for adjusting a position of the radio antenna.

An access point 102 implemented as a base station can wirelessly communicate with the user devices 104 within a cell 108 via one or more base station antennas. A cell 108 associated with an access point 102 can be divided into sectors making up only a portion of the cell (not shown). The network 100 can include base stations of different types (e.g., macro and/or small cell base stations). In some implementations, there can be overlapping geographic coverage areas (cell 108) for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.). In some embodiments, the access point 102 communicates with the user devices 104 via a fixed wireless access (FWA) connection. FWA is a type of 5G or 4G LTE wireless technology that enables fixed broadband access using radio frequencies rather than cables.

The user devices 104(*a-e*) can correspond to or include devices capable of communication using various connectivity standards. For example, a 5G communication channel can use millimeter wave (mmW) access frequencies of 28 GHz or more. In some implementations, a user device 104 can operatively couple to an access point 102 over a long-term evolution/long-term evolution-advanced (LTE/LTE-A) communication channel, which is referred to as a 4G communication channel. In some non-limiting examples, user devices can include handheld mobile devices (e.g., smartphones, portable hotspots, tablets, etc.); laptop devices; wearable devices; drones; vehicles with wireless connectivity; head-mounted displays with wireless augmented reality/virtual reality (AR/VR) connectivity; portable gaming consoles; wireless routers, gateways, modems, and other fixed-wireless access devices; wirelessly connected sensors that provides data to a remote server over a network; IoT devices such as wirelessly connected smart home appliances, etc.

A user device can communicate with various types of access points and network 100 equipment at the edge of a network 100 including macro eNBs/gNBs, small cell eNBs/gNBs, relay base stations, and the like. A user device can also communicate with other user devices either within or outside the same coverage area of a base station via device-to-device (D2D) communications.

The communication link 112 between a user device 104 and an access point 102 may include uplink (UL) transmissions from a user device 104 to an access point 102, and/or downlink (DL) transmissions from an access point 102 to a user device 104. The downlink transmissions can also be called forward link transmissions while the uplink transmissions can also be called reverse link transmissions. Each communication link includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links can transmit bidirectional communications using frequency division duplex (FDD) (e.g., using paired spectrum resources) or Time division duplex (TDD) operation (e.g., using unpaired spectrum resources). In some implementations, the communication links include LTE and/or mmW communication links.

User device 104 may include a number of software applications 118, each of which, when executed, may cause the user device to transmit a number of data packets over the network 100. In some cases, the number of data packets may be directed by the user device 104 to a target destination device 114. For example, given that a software application is supported by a remote server, the software application may cause the user device to send data packets to that remote server. A destination device 114 may include any suitable computing device configured to receive network data as implemented herein.

The core management device 110 provides, manages, and controls security services, user authentication, access authorization, tracking, Internet Protocol (IP) connectivity, and other access, routing, or mobility functions. The access points 102 interface with the a network managed by a core management device 110 through a first set of backhaul links (e.g., S1 interfaces) and can perform radio configuration and scheduling for communication with the user devices 104 or can operate under the control of a base station controller (not shown). In some examples, the access points 102 can communicate with each other, either directly or indirectly (e.g., through the network), over a second set of backhaul links (e.g., X1 interfaces), which can be wired or wireless communication links.

In embodiments, a network managed by a core management device 110 may be configured to aggregate information about network traffic tagging (e.g., categorization) and provide that aggregated information to a number of access points 102. In embodiments, the network managed by a core management device 110 may receive data about network traffic from a number of different access point devices. Such data may include information about a type or category of device from which the network traffic originated, metrics related to the network traffic itself, and/or information about a destination device 114 to which the network traffic is directed. In some embodiments, the core management device 110 may receive information from one or more base stations related to network traffic that is received from one or more destination device 114 and directed to a user device.

In such cases, the information may include an indication of a network slice over which the network traffic is received. The information received by the network managed by a core management device 110 may be aggregated and used to generate a set of configuration settings that can be provided to base stations in order to enable those base stations to allocate network traffic to an appropriate network slice.

In embodiments, the access point 102 (or another suitable access point device) may be configured to allocate a sequence of data packets received from a user device to a specified network slice 116. More particularly, a network 100 may consist of a number of network slices 116, each of which are dedicated to a type or category of network traffic. In such cases, the access point 102 may be configured to determine a type or category to be associated with the sequence of data packets in order to assign those data packets to an appropriate network slice 116. The type or category of the data packets may be determined based on at least one of a software application 118 (e.g., executed from a user device 104) that originated the data packets and/or a destination of the data packets. The network traffic may be associated with a tag based on its determined type.

The network 100 can include a 5G network 100 and/or an LTE/LTE-A or other network. In an LTE/LTE-A network, the term eNB is used to describe the access points 102, and in 5G new radio (NR) networks, the term gNBs is used to describe the access points 102 that can include mmW communications. The network 100 can thus form a heterogeneous network 100 in which different types of base stations provide coverage for various geographic regions. For example, each access point 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by user devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by user devices that have service subscriptions with the network 100 provider. A femto cell covers a relatively smaller geographic area (e.g., a home) and can provide restricted access by user devices having an association with the femto unit (e.g., user devices in a closed subscriber group (CSG), user devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a user device 104 and the access points 102 or core network supporting radio bearers for the user plane data. At the Physical (PHY) layer, the transport channels are mapped to physical channels.

As noted elsewhere, the network 100 may be partitioned into a number of network slices 116, with each of the individual network slices consisting of one or more bandwidth parts dedicated to a type of network traffic. For example, one network slice 116 of the number of network slices may be a range of bandwidth frequencies that is dedicated to communicating data packets between Internet of Things (IoT) devices to their respective support servers. The use of network slices to communicate dedicated traffic generally allows for the network slice to be optimized for that type of traffic. More particularly, each network slice may configured to accommodate a particular type of network traffic. By way of illustration, one network slice may be configured to optimize transmission of network traffic that requires significant bandwidth but is not latency-sensitive (e.g., download network traffic). Another network slice may be configured to optimize transmission of network traffic that is latency sensitive. In some cases, a default network slice may be maintained that is configured to handle a variety of different network traffic types without optimizing any particular aspect.

The illustrative network 100 may incorporate, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a user device 104 depicted in FIG. 1 carrying out wireless communications via an access point 102. Such a mobile wireless network system may include hundreds or thousands of such base stations.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
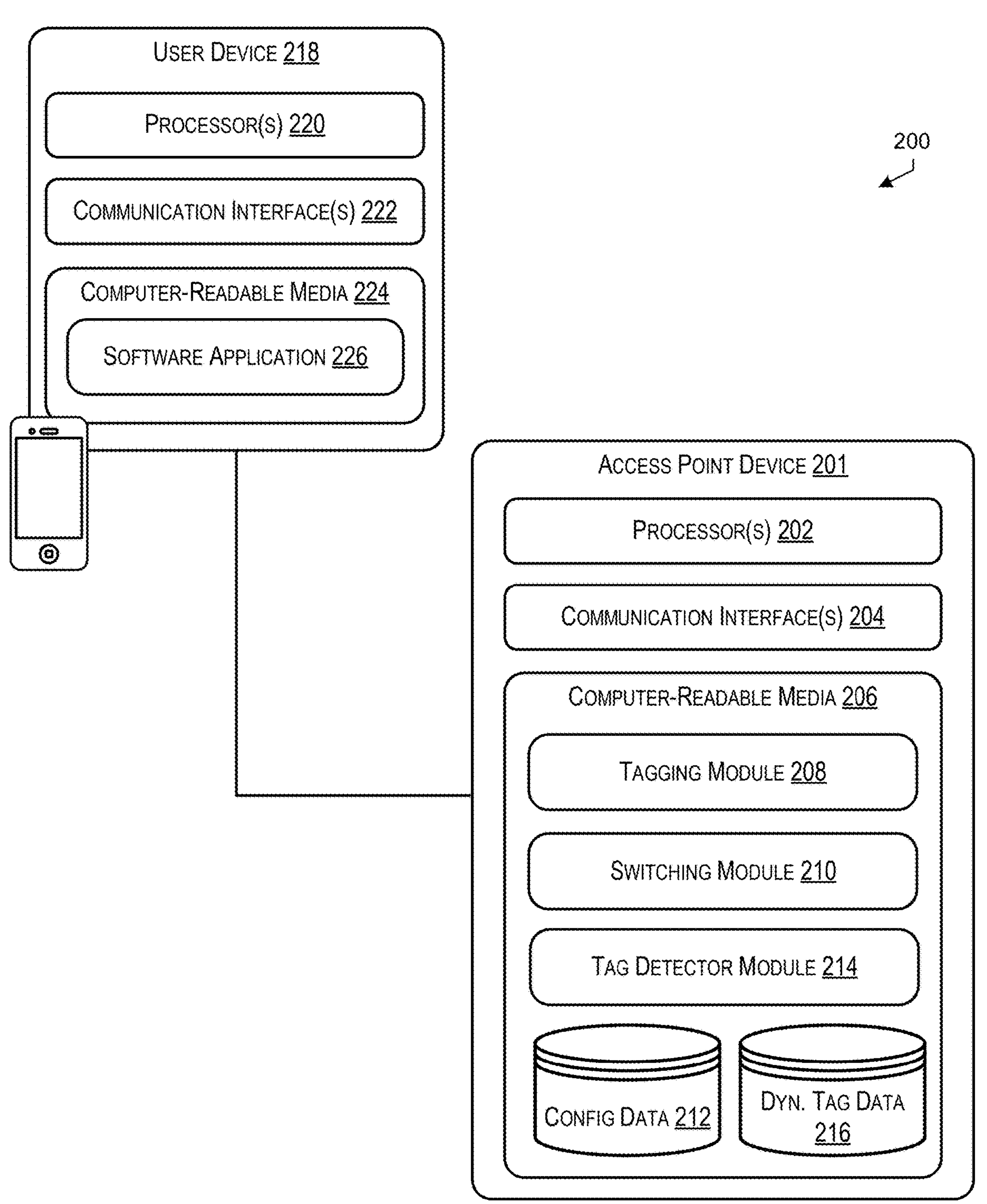
FIG. 2 depicts a component diagram of an example system to be implemented in a network in order to enable allocation of network traffic to a network slice in accordance with at least some embodiments.

FIG. 2 depicts a component diagram of an example system to be implemented in a network (e.g., a mobile network) in order to enable allocation of network traffic to a network slice in accordance with at least some embodiments. As depicted in FIG. 2, an access point device 201 is in communication with a number of user devices 218 operated by various users. Additionally, as described elsewhere, the access point device 201 may be further in communication with one or more backend servers (e.g., a core management device) and/or an external network.

In some embodiments, an exemplary access point device 201 may be an example of the access point 102 as described in relation to FIG. 1 above. In some embodiments, the access point device 201 is implemented on, or in direct communication with, an access point 102. It should be noted that such an access point device (or any other described computing component) may include a single computing device (e.g., a server device) or a combination of computing devices. In some cases, the access point device may be implemented as a virtual device/system (e.g., via virtual machines implemented within a cloud computing environment).

As illustrated, the access point device 201 may include one or more hardware processors 202 configured to execute one or more stored instructions. Such processor(s) 202 may comprise one or more processing cores. Further, the access point device 201 may include one or more communication interfaces 204 configured to provide communications between the access point device 201 and other devices, such as the user device 218 or any other suitable electronic device.

The access point device 201 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the access point 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the access point device 201 to perform various operations described herein. For example, the computer-readable media 206 may include some combination of components configured to implement the described techniques. Particularly, the access point device 201 may include a component configured to categorize received network traffic (e.g., tagging module 208) as well as a component configured to allocate network traffic to a network slice (e.g., switching module 210). In some cases, the access point device 201 may further include a component configured to determine a tag assigned to incoming network traffic data (tag detector module 214). Additionally, the computer-readable media 206 may further maintain one or more databases, such as a database of information maintained in relation to categorization of network traffic data (e.g., configuration data 212) and/or a database of dynamic tag information (e.g., dynamic tag data 216).

A tagging module 208 may be configured to, when executed by the processor(s) 202, assign a tag to network traffic received at the access point device 201. A tag may be any suitable indication of a category of network traffic. Such a tag may be attached to network traffic in any suitable manner. For example, a tag may be included in a header for the network traffic. In this example, a tag may be a numeric or string value that is included in a data field of the header. In some cases, the tagging module 208, upon identifying a tag to be assigned to network traffic, may be further configured to edit or otherwise update one or more values associated with the network traffic in order to reflect the identified tag.

The tagging module 208 may, upon receiving network traffic that is not already assigned a tag, first attempt to categorize the network traffic based on configuration data 212. For example, the configuration data 212 may include an indication of one or more network traffic attribute values (e.g., origination (e.g., device type, port, and/or channel), destination (e.g., device type, port, and/or channel), metrics, etc.) to be associated with a tag. In some cases, the configuration data may include an indication of a port and/or a channel to be associated with a tag, such that network traffic originating at or directed to a single device may be assigned different tags. In such cases, each port and/or channel may be associated with an application or function operating on the device. Note that in the configuration data 212, multiple network traffic attribute values may be associated with a single tag. For example, multiple different types of network traffic may be assigned a "latency-sensitive" tag. Upon determining that the network traffic satisfies the conditions associated with a tag in the configuration data 212, the tagging module 208 may assign that tag to the network traffic.

For example, a type of user device from which the traffic originated may be determined. In this example, traffic originating from a user device that is determined to have originated at a user device that is a known Internet of Things (IoT) device. The configuration data 212 may include an indication that network traffic originating at a device of the IoT device type is to be tagged as IoT network traffic. In such a case, the tagging module 208 will assign the network traffic with a tag associated with IoT network traffic.

In another example, information about a destination device of the network traffic may be determined. For example, a header associated with the network traffic may be inspected to identify information related to an origin device and/or a destination device for that network traffic. Based on that information, a determination may be made as to a device (e.g., a server or other destination device) to which the network traffic is directed. In this example, the configuration data 212 may include an indication that network traffic directed to that device should be assigned a particular tag. Hence, the tagging module 208 may be configured to assign the network traffic with the respective tag.

In some embodiments, the tagging module 208 may assign a tag to network traffic associated with a device based on a tag and/or category associated with network traffic directed into a local network. For example, if network traffic is received that is directed to a user device within the network (e.g., from a destination device and to a user device), then the tag detector module 214 may be configured to determine a tag for that network traffic (e.g., using data packet inspection). A tag associated with the incoming network traffic may be stored (either temporarily or permanently) within dynamic tag data 216. If the access point device then receives new network traffic as a response to the previous tagged incoming network traffic, then the stored tag may be retrieved from the dynamic tag data 216 and the new network traffic may be assigned the same network tag as the previous traffic.

By way of illustration, consider a scenario in which the access point device receives a request from a remote application server that is directed to a user device running an application supported by the remote application server. Assume for the purpose of this example that the received request is tagged as including "low latency" network traffic. If and when the access point device receives a response to the request from the user device to the remote application server, the network traffic associated with that response may be associated with the low-latency tag.

In some embodiments, the tagging module 208 may be configured to provide information about network traffic tagging to a backend server (e.g., core management device 110 as described in FIG. 1). As described elsewhere, information provided by the tagging module 208 on multiple access point device 201 may be used to generate configuration data 212 that is provided to the access point device 201.

A switching module 210 may be configured to, when executed by the processor(s) 202, analyze network traffic in order to allocate that network traffic to a particular network slice. In embodiments, when network traffic is received at an access point device that is directed to a destination device over a network, the switching module 210 is configured to identify a tag associated with that network traffic. In some cases, the switching module 210 first determines if the network traffic is already associated with a tag. In embodiments, this may involve inspecting a header or other data associated with the network traffic to identify the tag from one or more data values. If the network traffic is not currently associated with a tag, then the switching module 210 may be configured to execute the tagging module 208 to associate that network traffic with a tag.

Once a tag has been identified for the network traffic, the switching module 210 is configured to determine a network slice associated with that tag. The switching module 210 then configures the network traffic in accordance with the requirements of the identified respective network slice and transmits the network data to its intended destination device over that network slice.

The exemplary user device 218 may be an example of a user device 104 as described in relation to FIG. 1 above. As noted elsewhere, a user device 218 may include any suitable electronic device configured to interact with a network (e.g., via communication with a routing device).

Similar to the access point device 201, the user device 218 may include one or more hardware processors 220 configured to execute stored instructions. Such processor(s) 220 may comprise one or more processing cores. Further, the user device 218 may include one or more communication interfaces 222 configured to provide communications between the user device 218 and other devices, such as an access point device 201 or another suitable electronic device.

Similar to the access point device 201, the user device 218 may include computer-readable media 224 that stores various executable components (e.g., software-based components, firmware-based components, etc.). The computer-readable media 224 may store components to implement functionality described herein.

The computer-readable media 224 may include portions, or components, that configure the user device 218 to perform various operations described herein. For example, the computer-readable media 224 may include some combination of components configured to implement the described techniques. In embodiments, the computer-readable media 224 of the user device 218 may include one or more software application 226. A software application may be any suitable set of computer executable instructions that causes the user device to perform a function. In embodiments, the software application 226 may be supported by a remote server. In other words, when executed, the software application may cause the user device 218 to communicate with a remote server to perform at least a portion of the functionality provided by the software application 226. The network traffic generated during such a communication may be transmitted to the access point device to be processed by the slice allocation module 208 and/or traffic assessment module 210.

Figure 3:
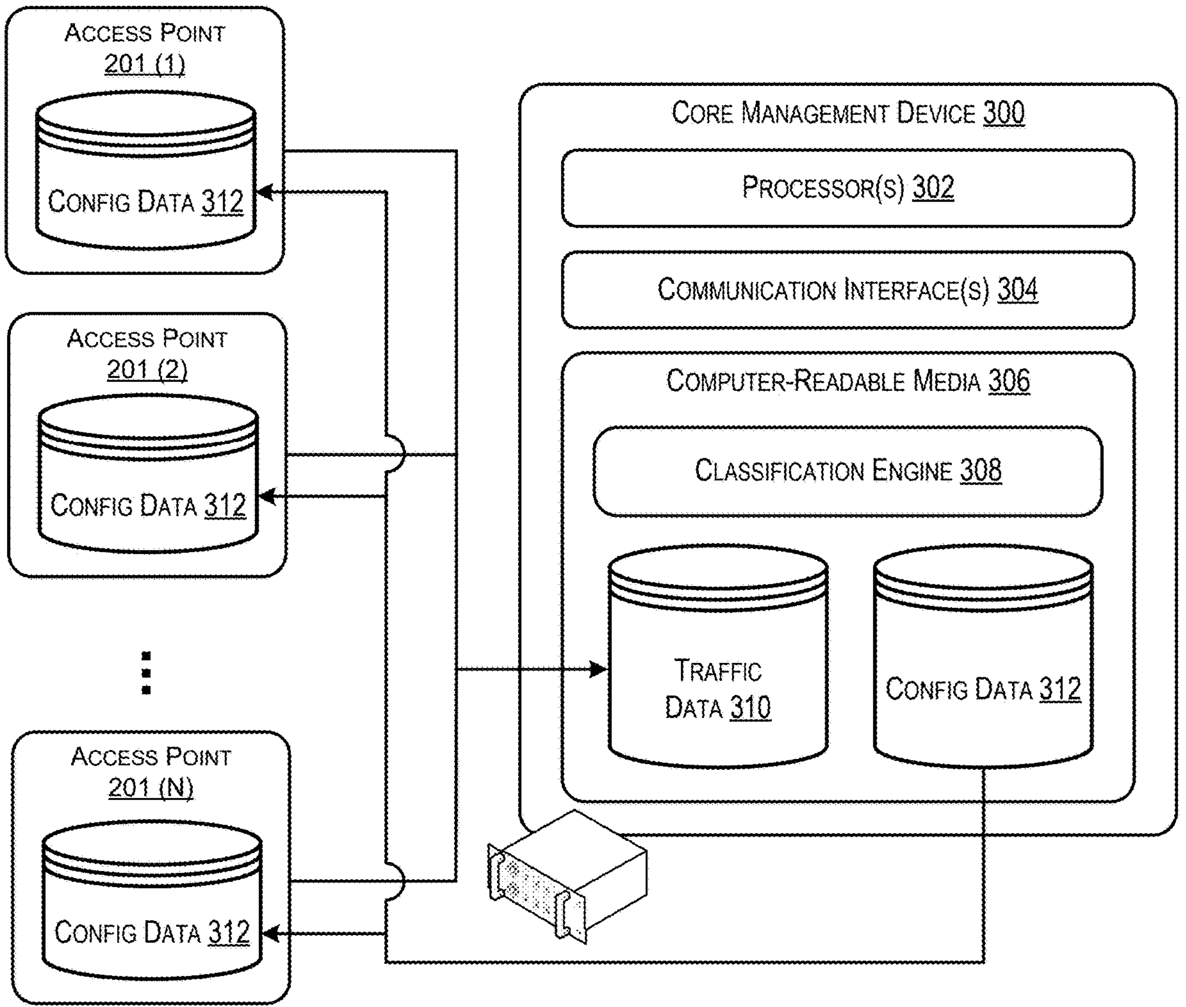
FIG. 3 depicts a component diagram of an example core management device to be implemented in a network (e.g., a mobile network) in order to enable allocation of network traffic to a network slice in accordance with at least some embodiments.

FIG. 3 depicts a component diagram of an example core management device to be implemented in a network (e.g., a mobile network) in order to enable allocation of network traffic to a network slice in accordance with at least some embodiments. As depicted, a core management device 300 may be in communication with multiple access point devices 201 (1-N). Access point devices 201 may be an example of the access point 102 as described in relation to FIG. 1 above.

The core management device 300 may include any suitable computing device configured to perform at least a portion of the functionality described herein. In some cases, the core management device 300 may be a server computing device. The core management device 300 may include one or more hardware processors 302 configured to execute one or more stored instructions. Such processor(s) 302 may comprise one or more processing cores. Further, the core management device 300 may include one or more communication interfaces 304 configured to provide communications between the core management device 300 and other devices, such as the access point devices 201.

The core management device 300 may also include computer-readable media 306 that stores various executable components (e.g., software-based components, firmware-based components, etc.). The computer-readable media 306 may store components to implement functionality described herein. While not illustrated, the computer-readable media 306 may store one or more operating systems utilized to control the operation of the one or more devices that comprise the core management device 300. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 306 may include portions, or components, that configure the core management device 300 to perform various operations described herein. For example, the computer-readable media 306 may include some combination of components configured to implement the described techniques. Particularly, the core management device 300 may include a component configured to aggregate information about network traffic categorization (classification engine 308). Additionally, the computer-readable media 206 may further maintain one or more databases, such as a database of information maintained in relation to network traffic received from the multiple access point devices (e.g., traffic data 310) as well as information about determined categorization of network traffic (category data 312).

Classification engine 308 may be configured to, when executed by the processor 302, categorize network traffic based on information received from the multiple access point devices 201 (1-N). As noted elsewhere, when network traffic is received at an access point device that is not associated with a tag, the access point device may execute a tagging module (e.g., tagging module 208) to determine an appropriate tag to be associated with that network traffic. Each time that such a tagging module is used to associate a tag with network traffic, information about the network tag (e.g., origin device, destination device, metrics, etc.) may be associated with an indication of the determined tag in traffic data 310.

In some embodiments, the classification engine 308 may be configured to resolve discrepancies in the information received from multiple access point devices in traffic data 310. In some cases, tag association discrepancies are resolved based on a simple majority. For example, assume three access point devices process network traffic originating from a type of electronic device. In this example, if two of the access point devices tag the network traffic with a first tag and one of the access point devices tag the network traffic with a second tag, then the discrepancy may be resolved in favor of associating the network traffic with the first tag.

In some embodiments, the traffic data 310 may be provided as input to one or more machine learning models. In embodiments, such a machine learning model may be trained to identify similarities between network traffic received at different access point devices (e.g., access point devices 201 (1-N)) based on one or more attributes associated with the network traffic. In embodiments, such a machine learning model may be trained to identify similarities between untagged network traffic and network traffic associated with known tags.

Once the classification engine 308 has generated category data 312 the core management device 300 may provide that category data 312 to each of the access point devices 201 to be used in allocating future network traffic to respective network slices.

Figure 4:
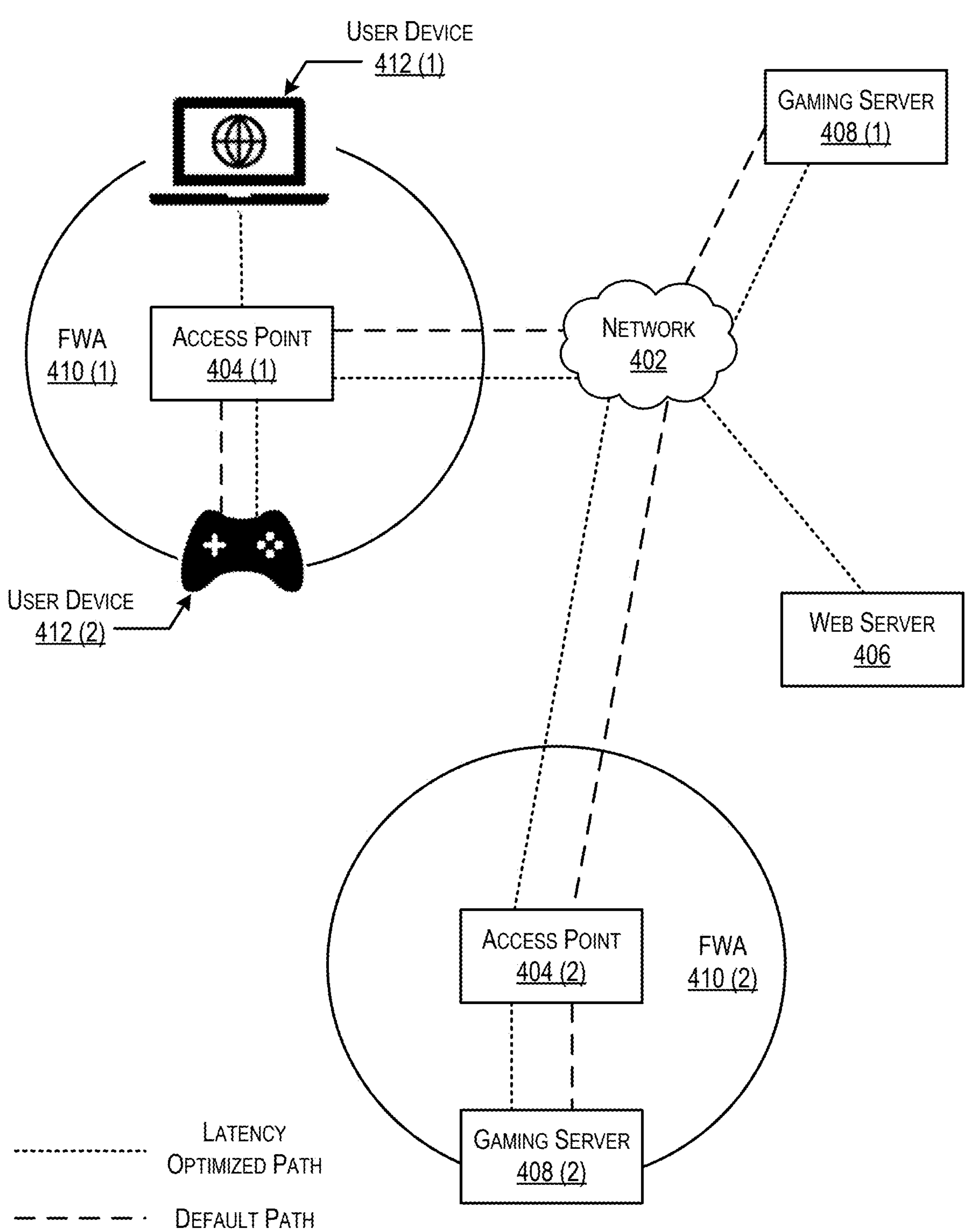
FIG. 4 depicts a block diagram illustrating network traffic flow pathways (e.g., network slices) between various components in a network in accordance with some embodiments.

FIG. 4 depicts a block diagram illustrating network traffic flow pathways (e.g., network slices) between various components in a network in accordance with some embodiments. The process 400 as depicted in FIG. 4 may represent interactions between various components of the system as described in relation to FIG. 1 above.

As depicted in FIG. 4, a network 402 may be accessed by a number of computing devices. The network may be an example of the network 100 as described in relation to FIG. 1 above. In the exemplary figure, the network 402 is in communication with multiple access points 404 (1-2) as well as multiple server computing devices, such as web server 406 and gaming server 408. As noted elsewhere, each of the access points 404 (1-2) may manage a local network.

In some cases, the access points 404 (1-2) may each manage a respective FWA 410 (1-2) that provides access to multiple user devices 412 (1-2) in proximity to (e.g., within wireless communication range of) the respective access point. It should be noted that any suitable type of computing device capable of wireless communication may connect to the network 402 via a FWA 410. By way of nonlimiting example, the FWA may connect to the access point to a mobile device (e.g., a cellular phone), a personal computer, a number of wireless electronic device (e.g., a gaming controller as depicted) or a server computing device (e.g., gaming server 408 (2)).

As described elsewhere, the network 402 may include a number of network slices (referred in FIG. 4 as paths) over which network traffic data may be communicated. As also described elsewhere, each of such network slices may be optimized to convey a particular type of network traffic. In addition to a number of network slices that are each optimized for a particular type of network traffic, the network 402 may include a default path (e.g., default network slice) over which network traffic is conveyed if it is untagged or does not require optimization.

By way of illustration, one path (e.g., network slice) may be optimized to convey latency-sensitive network traffic (e.g., network traffic for which a high-degree of fidelity is required). One non-limiting example of such latency-sensitive network traffic might be network traffic conveyed between a gaming controller (an example of user device 412 (2)) and a gaming server 408. In this example, where the gaming controller is used to control actions within a game, reducing lag in the network connection (e.g., increasing responsiveness to commands) is the highest priority for the network traffic between the gaming controller and a gaming server 408. Hence, network traffic routed between the gaming controller and a gaming server 408 should be tagged as "latency sensitive" and routed over one or more network slices associated with the latency optimized path.

In some embodiments, all network traffic directed to, or originating at, a particular device may be assigned a respective tag so that it is routed over the appropriate path. In some cases, such network traffic is tagged by the device, or an application operating on the device, when the network traffic is originated. In other embodiments, an access point 404 may be provided with configuration data (e.g., configuration data 212 as described in relation to FIG. 2 above) that indicates any network traffic originating at a first device, or directed to a second device, should be assigned a respective tag. In these embodiments, the access point may inspect the network traffic when it is received and, provided that the network traffic is not already assigned a tag, assign it a tag based on the stored configuration data.

Network traffic that is routed through the network 402 may be inspected to determine a number of attributes associated with that network traffic. By way of example, the network traffic may include an address (e.g., FQDN or IP), a protocol, and/or an incoming port number. The tag to be assigned to particular network traffic as indicated in the configuration data may be determined based on such attributes. The information may be obtained from any suitable portion of the network traffic data. For example, the information may be obtained from one or more data fields included in a header for the network traffic.

Figure 5:
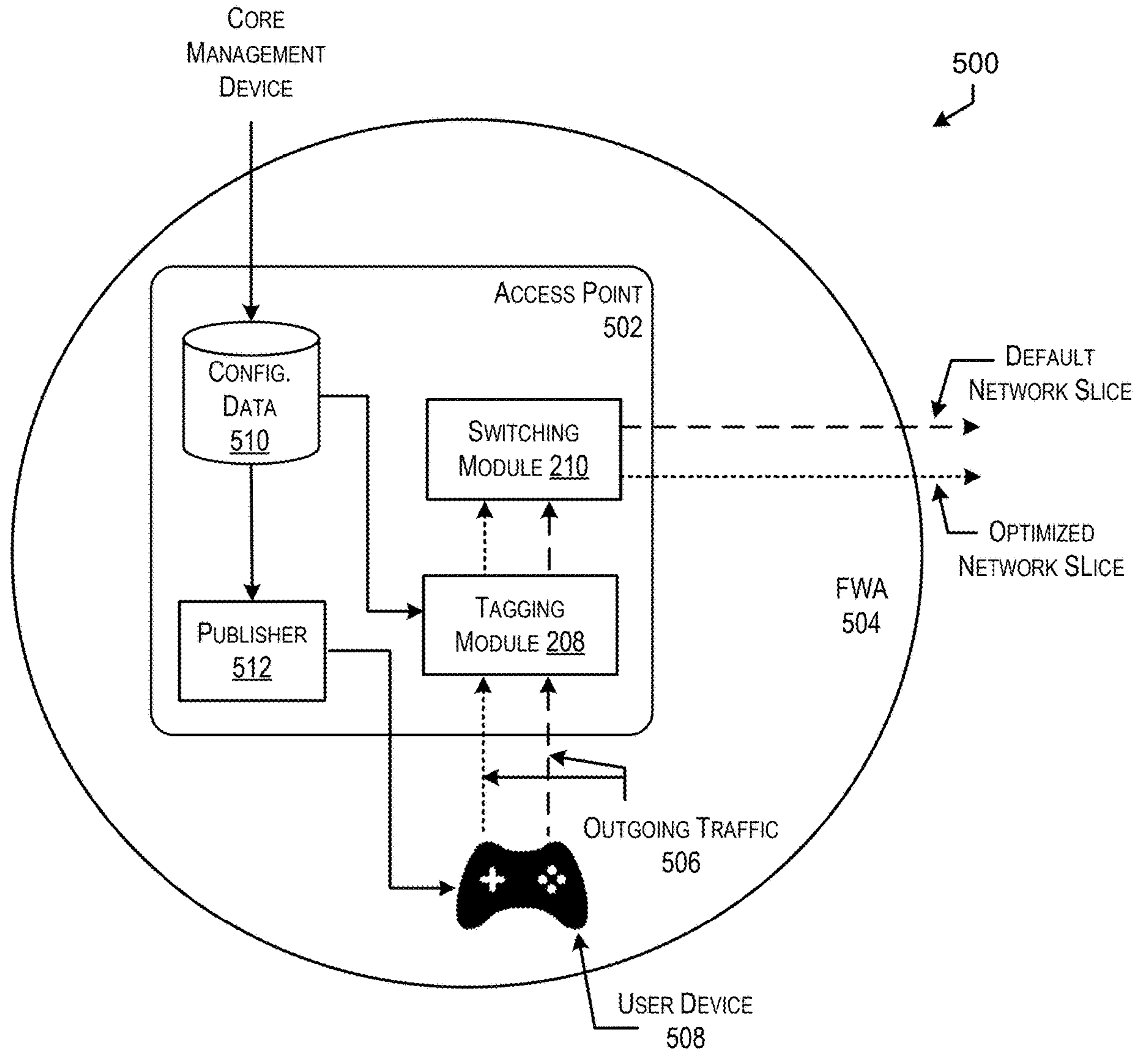
FIG. 5 depicts a block diagram illustrating a process for allocating network traffic to an appropriate network slice in accordance with embodiments.

FIG. 5 depicts a block diagram illustrating a process for allocating network traffic to an appropriate network slice in accordance with embodiments. The process 500 may be performed by an access point device 502, which may be an example of access point device 201 as described in relation to FIG. 2 above.

As noted elsewhere, an access point may include a tagging module 208 configured to assign a tag to untagged network traffic, a switching module 210 configured to allocate network traffic to a respective network slice/path based on a tag assigned to that network traffic.

In embodiments, the access point device 502 is configured to convey network traffic between devices operating on a local network or FWA (e.g., FWA 504) and devices operating outside of the local network or FWA (e.g., over a second network).

Additionally, as noted elsewhere, the access point device 502 may receive configuration data 510 from another computing device (e.g., a core management device 300 as described in relation to FIG. 3 above) that includes an indication of network traffic attribute values to be associated with a tag.

In embodiments, the access point device 502 may receive outgoing network traffic 506 originating at one or more user device 508 in communication with the access point device 502 and directed to an entity outside of the FWA 504. Upon receiving the outgoing traffic 506, the access point device 502 may initially determine whether the outgoing traffic 506 is assigned a tag. If the outgoing traffic 506 is already assigned a tag, then a network slice associated with that tag is identified and the outgoing traffic 506 is routed to its destination over the determined network slice. If the outgoing traffic 506 is not already assigned a tag, then the tagging module attempts to identify a tag that is appropriate to the outgoing traffic 506.

The tagging module 208, in attempting to determine an appropriate tag to be assigned to the outgoing traffic 506, may first compare attribute values associated with the outgoing traffic to attribute values indicated as being associated with a tag in configuration data 510. In some cases, the tagging module 208 may inspect a header or metadata tag associated with the outgoing traffic. In other cases, the tagging module 208 may perform a deep packet inspection (DPI) to determine a type or category associated with the data included in the network traffic. DPI is an advanced method of examining and managing network traffic that locates, identifies, and classifies packets with specific data or code payloads that conventional packet filtering, which examines only packet headers, may not detect.

If the tagging module 208 is initially unable to identify a tag to be associated with the outgoing traffic 506, then the tagging module 208 may be configured to determine a most-appropriate tag. In some cases, this may involve the use of one or more machine learning models.

In some embodiments, the tagging module 208 uses one or more trained machine learning models to determine a tag for untagged network traffic. Such machine learning models may have been trained to identify similarities between untagged network traffic and known tagged network traffic by correlating a number of attribute values (and/or data type) associated with the untagged network traffic to similar attribute values associated with the tagged network traffic. In embodiments, the trained machine learning model determines a likelihood for each of multiple potential tags to be appropriate for the network traffic based on its attribute values/data type.

If the tagging module 208 is unable to identify an appropriate tag for the outgoing traffic 506, that outgoing traffic is routed to its destination over the default network slice. Note that the tagging module 208 may report information about the tag assigned to the outgoing traffic, as well as information about the outgoing traffic, to a second computing device (e.g., a core management device 300 as described in relation to FIG. 3 above). Such information may include information about a tag that was already assigned to the outgoing traffic 506 before it was received at the access device.

In some embodiments, the access device 502 may provide at least a portion of the configuration data 510 to one or more user device 508. For example, upon determining that the configuration data 510 (as provided by another computing device) includes tag assignment information relating to a particular device type, then the access point device 502 may publish that tag assignment information to the user device 508 (via a publisher module 512). In such cases, the user device 508 may receive the tag assignment information if it is configured to use such information. Provided that the user device 508 is configured to use such data, future network traffic generated by that user device 508 may be tagged prior to be transmitted to the access point device 502.

Figure 6:
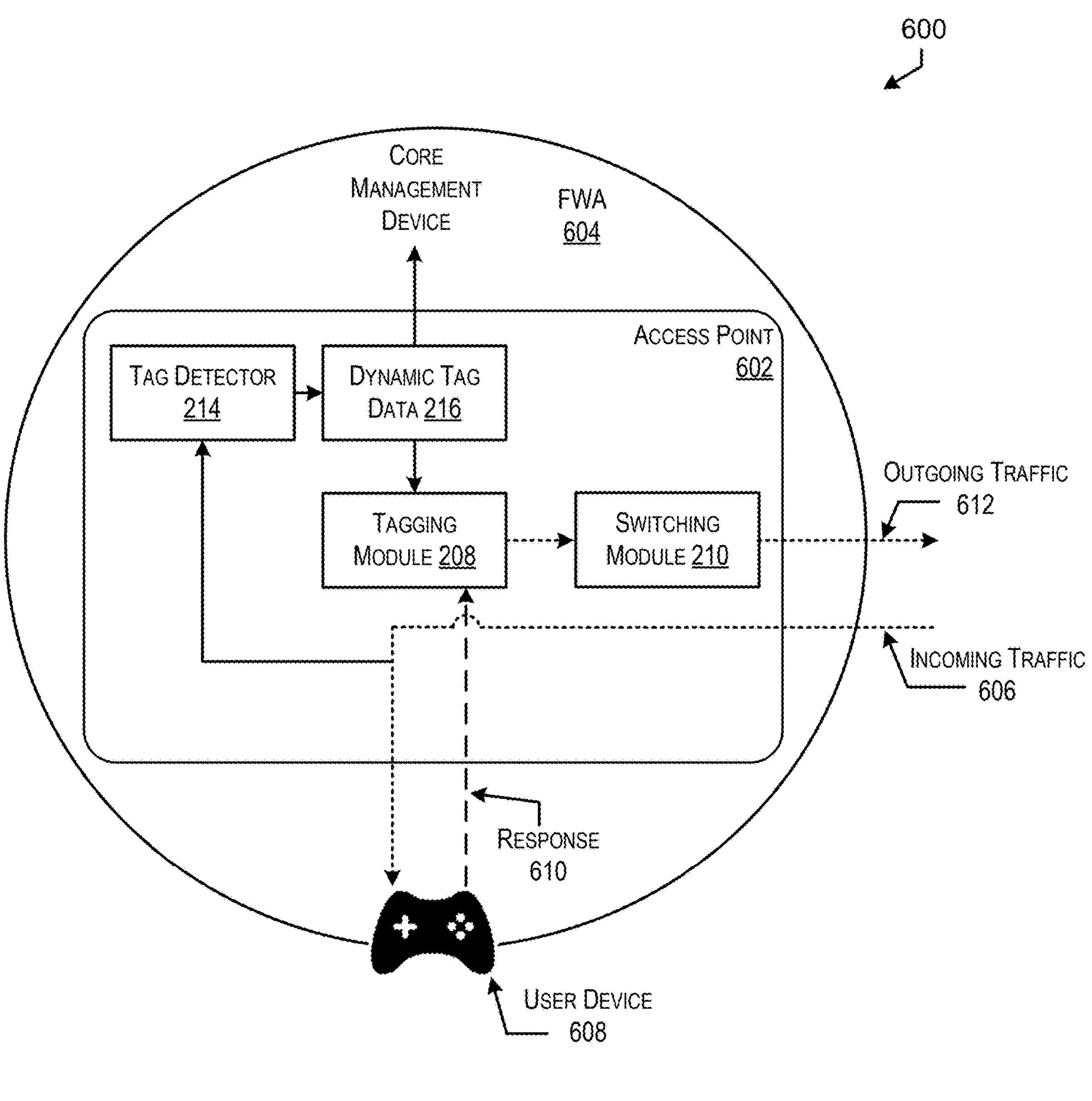
FIG. 6 depicts a block diagram illustrating a process for dynamically assigning a tag to a response in accordance with at least one embodiment.

FIG. 6 depicts a block diagram illustrating a process for dynamically assigning a tag to a response in accordance with at least one embodiment. The process 600 may be performed by an access point device 602, which may be an example of access point device 201 as described in relation to FIG. 2 above.

As noted elsewhere, an access point may include a tagging module 208 configured to assign a tag to untagged network traffic, a switching module 210 configured to allocate network traffic to a respective network slice/path based on a tag assigned to that network traffic, and/or a tag detector module 214 configured to identify a tag associated with incoming network traffic.

In embodiments, the access point device 602 is configured to convey network traffic between devices operating on a local network or FWA (e.g., FWA 604) and devices operating outside of the local network or FWA (e.g., over a second network). Accordingly, the access point device 602 may receive incoming traffic 606 and route that incoming traffic to a respective user device 608 to which the incoming traffic 606 is directed.

In embodiments, a tag detector module 214 may be configured to monitor incoming network traffic 606 in order to determine a tag associated with that incoming network traffic. In some embodiments, the tag detector module 214 may inspect one or more data packets of the incoming traffic 606 to determine a respective tag for that network traffic. In some embodiments, a tag for the incoming traffic may be indicated in a data value included in the header for that incoming traffic. Such a data value may be formatted as a numeric value, a string of characters, or any other suitable data value format.

Upon determining a tag assigned to the incoming traffic 606, the tag detector module 214 may store that tag in a database table (or another suitable memory structure) such as dynamic tag data 216 in relation to the incoming traffic 606.

In some embodiments, the access point device 602 may receive a response 610 to the incoming traffic 606 from the user device 608. As depicted in the figure, the response 610 may include network traffic that is untagged. Note that this may occur if the user device 608 (or an application operating on the user device) is unable to tag the network traffic. This, in turn, may occur because the developer/manufacturer was unfamiliar with network slicing technology or because the development of the user device/application predates the use of network slicing technology (e.g., the user device is a legacy device).

Upon detecting that the network traffic included in response 610 is untagged, the tagging module may first attempt to retrieve a tag to be assigned to the network traffic from configuration data that is stored in the memory of the access point device 602. If the tagging module 208 is unable to identify an appropriate tag from the configuration data, then the tagging module may retrieve the tag stored in the dynamic tag data 216 in relation to the incoming traffic 606. The tagging module 208 then assigns the determined tag to the response 610.

Once the network traffic is assigned a tag, that network traffic is then provided to the switching module 210. The switching module 210 assigns the network traffic to an appropriate network slice/path based on the assigned tag and transmits the network traffic over that network slice as outgoing traffic 612.

In embodiments, the data stored in the dynamic tag data 216 is provided to at least one second computing device (e.g., a core management device 300 as described in relation to FIG. 3 above) to be used in generating configuration data that is distributed to other access point devices.

Figure 7:
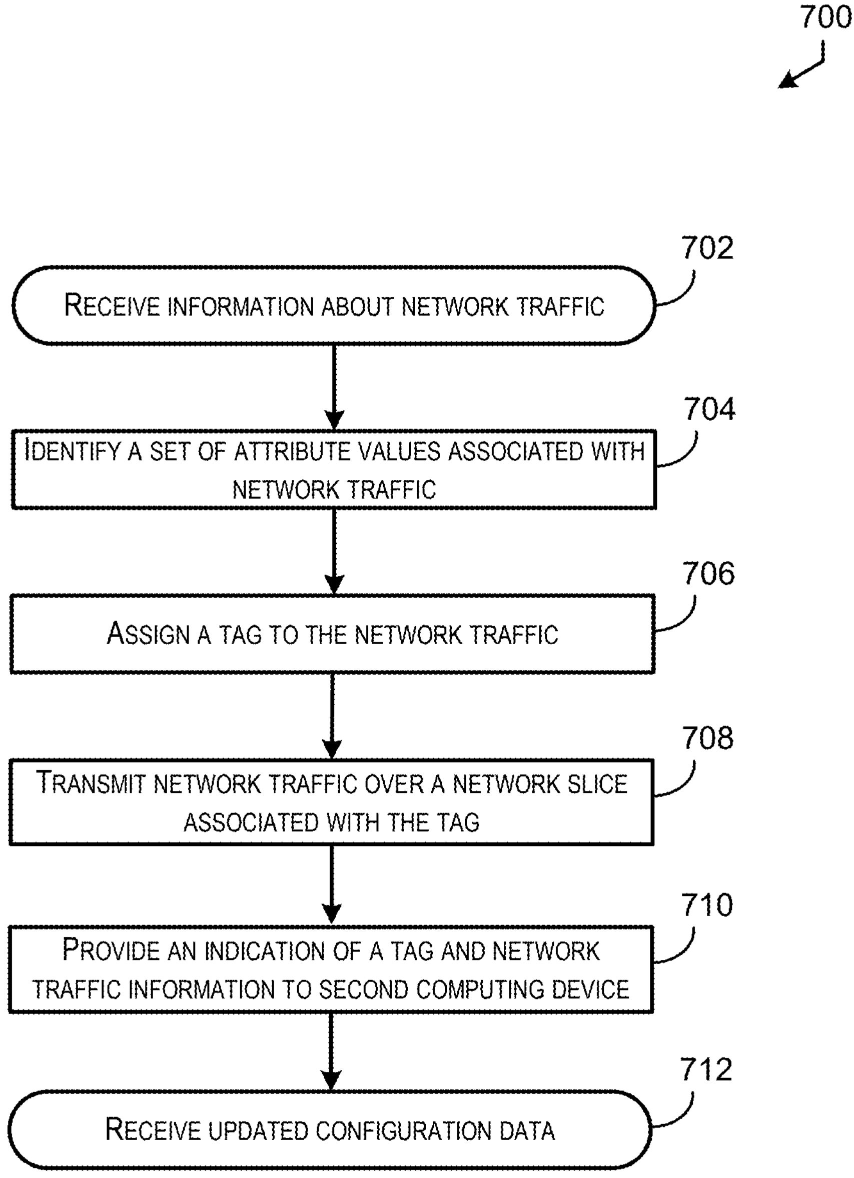
FIG. 7 depicts a flow diagram illustrating an exemplary process for generating and distributing configuration data to be used in network traffic allocation in accordance with at least some embodiments.

FIG. 7 depicts a flow diagram illustrating an exemplary process for generating and distributing configuration data to be used in network traffic allocation in accordance with at least some embodiments. The process 700 may be performed by an access point device, such as the access point device 201 as described in relation to FIG. 2 above. The access point device may be any suitable computing device that manages access to a network for one or more geographically proximate user devices. The network may be partitioned into a number of network slices. In some embodiments, the access point device may be implemented in a base station that manages a FWA network providing wireless service to user devices located within wireless communication range.

At 702, the process 700 may involve receiving information about network traffic received at an access point device. The network traffic may be received from a user device in geographic proximity to the computing device. In some embodiments, the information about network traffic is determined based on one or more data values included in a header associated with the network traffic. In some embodiments, the information about the network traffic is received using deep packet inspection.

At 704, the process 700 may involve identifying a set of attribute values associated with the network traffic. In some embodiments, the information about the network traffic comprises information about an origination device or a destination device associated with the network traffic.

At 706, the process 700 may involve assigning a tag to the network traffic. In some embodiments, the tag is assigned based at least in part on a destination device associated with the network traffic. In some cases, the tag is further assigned based on a particular port and/or channel associated with the destination device. In some embodiments, the tag is assigned based at least in part on an origination device associated with the network traffic. In some cases, the tag is further assigned based on a particular application executed on the origination device.

In some embodiments, the access point device may receive a communication (e.g., a second network traffic) over the network that is directed to a user device in proximity to the access point device. In such embodiments, the access point device may record a tag that is associated with the received communication. When the network traffic is received subsequent to that communication, the access point device may determine that the network traffic is a response to the communication. Upon making such a determination, the network traffic may be assigned the same tag as assigned to the communication.

In embodiments, the tag is assigned based on a degree of similarity between the information about the network traffic and second information about second network traffic associated with the tag in the configuration data. In some cases, this may involve determining whether the information about the network traffic meets one or more conditions associated with a tag within the configuration data. In other cases, this may involve using a machine learning model that has been trained to determine a degree of similarity between untagged network traffic and network traffic assigned a known tag.

At 708, the process 700 may involve transmitting the network traffic over the network using a network slice associated with the tag. In embodiments the network slice comprises a portion of a network that is optimized for transmission of a type or category of network traffic.

At 710, the process 700 may involve providing an indication of the assigned tag and the network traffic information to a second computing device. In some embodiments, the at least one second computing device is a core management device that manages operations within a network.

At 712, the process 700 may involve receiving updated configuration data. In some embodiments, the updated configuration data is generated from information about network traffic received from multiple access point devices.

Figure 8:
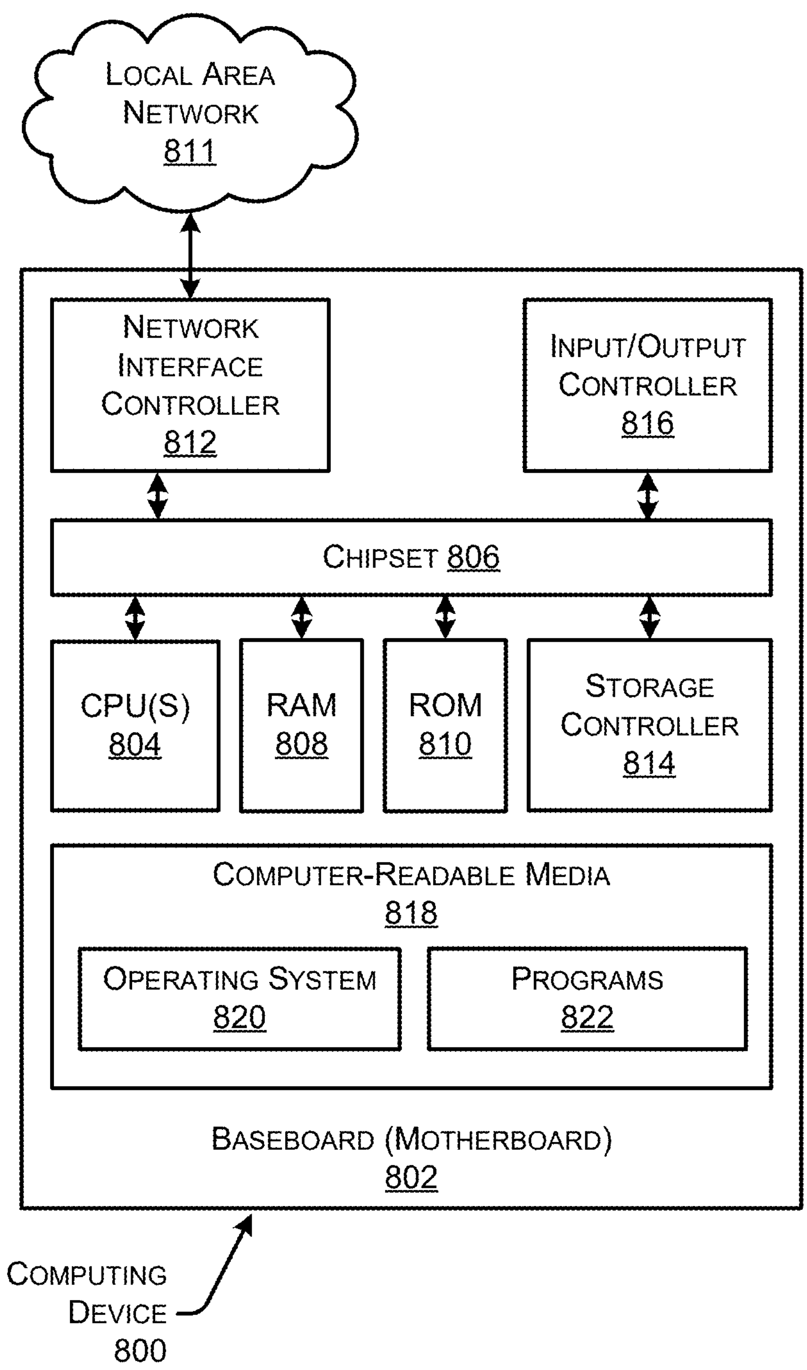
FIG. 8 shows an example computer architecture for a computing device capable of executing program components for implementing the functionality described above.

FIG. 8 shows an example computer architecture for a computing device 800 capable of executing program components for implementing the functionality described above. Such a computing device 800 may be implemented as an access point device (e.g., access point device 201) as described herein. The computer architecture shown in FIG. 8 illustrates a conventional server computer, workstation, desktop computer, laptop, tablet, network appliance, e-reader, smartphone, or other computing device, and can be utilized to execute any of the software components presented herein. The computing device 800 may, in some examples, correspond to a physical server as described herein, and may comprise networked devices such as servers, switches, routers, hubs, bridges, gateways, modems, repeaters, access points, etc.

The computing device 800 includes a baseboard 802, or "motherboard," which is a printed circuit board to which a multitude of components or devices can be connected by way of a system bus or other electrical communication paths. In one illustrative configuration, one or more central processing units ("CPUs") referred to as processors 804 operate in conjunction with a chipset 806. The processors 804 can be standard programmable processors that perform arithmetic and logical operations necessary for the operation of the computing device 800.

The processors 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the processors 804 and the remainder of the components and devices on the baseboard 802. The chipset 806 can provide an interface to a RAM 808, used as the main memory in the computing device 800. The chipset 806 can further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM can also store other software components necessary for the operation of the computing device 800 in accordance with the configurations described herein.

The computing device 800 can operate in a networked environment using logical connections to remote computing devices and computer systems through a network, such as the network 811. The chipset 806 can include functionality for providing network connectivity through a NIC 812, such as a gigabit Ethernet adapter. The NIC 812 is capable of connecting the computing device 800 to other computing devices over the network 811. It should be appreciated that multiple NICs 812 can be present in the computing device 800, connecting the computer to other types of networks and remote computer systems.

The computing device 800 can be connected to a storage device 818 that provides non-volatile storage for the computer. The storage device 818 can store an operating system 820, programs 822, and data, which have been described in greater detail herein. The storage device 818 can be connected to the computing device 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA")

interface, a fiber channel ("FC") interface, or other type of interface for physically connecting and transferring data between computers and physical storage units.

The computing device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 can further read information from the storage device 818 by detecting the physical states or characteristics of one or more particular locations within the physical storage units.

In addition to the mass storage device 818 described above, the computing device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 800. In some examples, the operations performed by devices as described herein may be supported by one or more devices similar to computing device 800. Stated otherwise, some or all of the operations performed by an edge device, and/or any components included therein, may be performed by one or more computing device 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 800.

In one embodiment, the storage device 818 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs (e.g., processors 804) transition between states, as described above. According to one embodiment, the computing device 800 has access to computer-readable storage media storing computer-executable instructions which, when executed by the computing device 800, perform the various processes described above with regard to the other figures. The computing device 800 can also include computer-readable storage media having instructions stored thereupon for performing any of the other computer-implemented operations described herein.

The computing device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 800 might not include all of the components shown in FIG. 8, can include other components that are not explicitly shown in FIG. 8, or might utilize an architecture completely different than that shown in FIG. 8.

As described herein, the computing device 800 may include one or more hardware processors 804 (processors) configured to execute one or more stored instructions. The processors 804 may comprise one or more cores. Further, the computing device 800 may include one or more network interfaces configured to provide communications between the computing device 800 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 811. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 822 may comprise any type of programs or processes to perform the techniques described in this disclosure. The programs 822 may comprise any type of program that cause the computing device 800 to perform techniques for communicating with other devices using any type of protocol or standard usable for determining connectivity.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, one or more module executed on the computing device 800 may also include computer executable instructions that, when executed by processor(s), cause computing device 800 to perform the techniques described herein. To do so, in some embodiments, a module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, one or more module included on the computing device 800 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at an access point device, information about multiple transmissions of network traffic that are untagged;

for each transmission of the multiple transmissions of network traffic, identifying, by the access point device within the information about that transmission of network traffic, a set of attribute values associated with that transmission of network traffic;

for each transmission of the multiple transmissions of network traffic, assigning, by the access point device based on the set of attribute values associated with that transmission of network traffic and based on configuration data, a tag to that transmission of network traffic;

for each transmission of the multiple transmissions of network traffic, transmitting, by the access point device, that transmission of network traffic over a network slice associated with the tag to that transmission of network traffic;

providing an indication of the tags and information about the multiple transmissions of network traffic to at least one second computing device; and receiving, at the access point device from the at least one second computing device, updated configuration data, wherein the tags for the multiple transmissions of network traffic include at least three different tags for three different types of network traffic.

2. The method of claim 1, wherein one of the tags is assigned based at least in part on a destination device associated with the corresponding transmission of network traffic.

3. The method of claim 1, wherein one of the tags is assigned based at least in part on an origination device associated with the corresponding transmission of network traffic.

4. The method of claim 1, wherein at least one transmission of the multiple transmissions of the network traffic is determined to be a response to second network traffic and the corresponding tag(s) are determined based being assigned to the second network traffic.

5. The method of claim 1, wherein one of the tags is assigned based on a degree of similarity between the information about the corresponding network traffic and second information about second network traffic associated with the one of the tags in the configuration data.

6. The method of claim 1, wherein the information about the network traffic is received using deep packet inspection.

7. The method of claim 1, wherein the updated configuration data is generated from information about network traffic received from multiple access point devices.

8. The method of claim 1, wherein the at least one second computing device comprises a core management device.

9. The method of claim 1, wherein the network slices are each configured to transmit a type of network traffic in an optimal manner.

10. A computing device comprising:

one or more processors; and one or more non-transitory computer-readable media storing computer-executable instructions that, when executed by the one or more processors, cause computing device to perform operations comprising:

receiving multiple transmissions of network traffic that are untagged;

for each transmission of the multiple transmissions of network traffic, determining information about that transmission of network traffic;

for each transmission of the multiple transmissions of network traffic, identifying, based on the information about that transmission of network traffic, a set of attribute values associated with that transmission of network traffic;

for each transmission of the multiple transmissions of network traffic, assigning, based on the set of attribute values associated with that transmission of network traffic and based on configuration data, a tag to that transmission of network traffic; and for each transmission of the multiple transmissions of network traffic, allocating that transmission of network traffic to a network slice associated with the tag to that transmission of network traffic, wherein the tags for the multiple transmissions of network traffic include at least three different tags for three different types of network traffic.

11. The computing device of claim 10, wherein the computing device manages access to a network that is partitioned into a number of network slices.

12. The computing device of claim 10, wherein the computing device is implemented in a base station that manages a fixed wireless access (FWA) network.

13. The computing device of claim 10, wherein the network traffic is received from a user device in geographic proximity to the computing device.

14. The computing device of claim 10, wherein the operations further comprise providing indications of the tags and the determined information about the multiple transmissions of network traffic to at least one second computing device.

15. The computing device of claim 14, wherein the operations further comprise receiving, from the at least one second computing device, updated configuration data that includes the indications of the tags and the determined information about the multiple transmissions of network traffic.

16. The computing device of claim 10, wherein each of the network slices is optimized for a type of network traffic.

17. One or more non-transitory computer-readable media storing computer-executable instructions that, when executed by one or more processors, cause the one or more processors to perform operations comprising:

receiving multiple transmissions of network traffic that are untagged;

for each transmission of the multiple transmissions of network traffic, determining information about that transmission of network traffic;

for each transmission of the multiple transmissions of network traffic, identifying, based on the information about that transmission of network traffic, a set of attribute values associated with that transmission of network traffic;

for each transmission of the multiple transmissions of network traffic, assigning, based on the set of attribute values associated with that transmission of network traffic and based on configuration data, a tag to that transmission of network traffic; and for each transmission of the multiple transmissions of network traffic, allocating that transmission of network traffic to a network slice associated with the tag to that transmission of network traffic, wherein the tags for the multiple transmissions of network traffic include at least three different tags for three different types of network traffic.

18. The one or more non-transitory computer-readable media of claim 17, wherein the information about a transmission of the multiple transmissions of network traffic comprises information about an origination device or a destination device associated with that transmission of network traffic.

19. The one or more non-transitory computer-readable media of claim 17, wherein one of the tags is assigned using one or more machine learning models based on a degree of similarity between the information about a transmission of the multiple transmissions of network traffic and second information about second network traffic associated with that tag in the configuration data.

20. The one or more non-transitory computer-readable media of claim 17, wherein one of the network slices is optimized for a category of network traffic and a corresponding one of the tags is assigned based on the network traffic being determined to be of the category of network traffic.

* * * * *